(12) United States Patent
Marsh et al.

(10) Patent No.: US 6,681,325 B1
(45) Date of Patent: Jan. 20, 2004

(54) PROVIDING DISK LAYOUT INFORMATION TO AN OPERATING SYSTEM FOR BOOTING AFTER DISK REPARTITIONING

(75) Inventors: Russell J. Marsh, Lindon, UT (US); Niel Orcutt, Pleasant Grove, UT (US)

(73) Assignee: PowerQuest Corporation, Orem, UT (US)

( * ) Notice: Subject to any disclaimer, the term of this patent is extended or adjusted under 35 U.S.C. 154(b) by 0 days.

(21) Appl. No.: 09/396,592

(22) Filed: Sep. 15, 1999

(51) Int. Cl.[7] .......................... G06F 15/177; G06F 1/24; G06F 12/00
(52) U.S. Cl. ................ 713/2; 713/1; 713/100; 711/161; 711/173
(58) Field of Search ................ 713/1, 2, 100; 711/173, 161, 113

(56) References Cited

U.S. PATENT DOCUMENTS

| | | | | |
|---|---|---|---|---|
| 5,136,711 A | * | 8/1992 | Hugard et al. | 713/2 |
| 5,649,133 A | * | 7/1997 | Arquie | 395/348 |
| 5,649,158 A | * | 7/1997 | Lahr et al. | 711/161 |
| 5,668,992 A | * | 9/1997 | Hammer et al. | 713/1 |
| 5,675,769 A | | 10/1997 | Ruff et al. | 395/497.04 |
| 5,706,472 A | | 1/1998 | Ruff et al. | 395/497.04 |
| 5,930,831 A | | 7/1999 | Marsh et al. | 711/173 |
| 5,956,745 A | | 9/1999 | Bradford et al. | 711/137 |
| 5,974,517 A | * | 10/1999 | Gaudet | 711/173 |
| 5,974,567 A | * | 10/1999 | Dickson, Jr. et al. | 714/27 |
| 6,032,239 A | * | 2/2000 | Beelitz | 711/173 |
| 6,108,759 A | | 8/2000 | Orcutt et al. | 711/173 |
| 6,185,575 B1 | * | 2/2001 | Orcutt | 707/200 |
| 6,205,558 B1 | * | 3/2001 | Sobel | 714/15 |
| 6,289,426 B1 | * | 9/2001 | Maffezzoni et al. | 711/173 |
| 6,298,427 B1 | * | 10/2001 | Beelitz | 711/173 |
| 6,430,653 B1 | * | 8/2002 | Fujikawa | 711/113 |
| 6,526,493 B1 | * | 2/2003 | Ding | 711/170 |

FOREIGN PATENT DOCUMENTS

EP  0794484 A2 * 9/1997

OTHER PUBLICATIONS

"Supporting Removeable Storage Media Which Has Multiple Partitions", IBM TDB, May 1995, vol. 38, pp 151–152.*
David Ripton, "Registry Misbehaving", Sep. 16, 1997, pp 1–2.*
Robert E Fine, "Recreating Registry" Sep. 13, 1997, pp 1–5.*
Doug McFadyen, "Re: Restore NT on different hardware" Jan. 14, 1996, pp 1–3.*
Helen Custer, Inside the Windows NT File Systemp, 1994.
Why Setup Reboots Three Times When Converting to NTFS, May 8, 1997.

* cited by examiner

Primary Examiner—Thomas Lee
Assistant Examiner—Chun Cao
(74) Attorney, Agent, or Firm—Computer Law[++]

(57) ABSTRACT

The HKEY−LOCAL_MACHINE\SYSTEM\DISK\Information Windows NT registry key contains disk layout information, such as disk letter assignments. During repartitioning of a hard drive, this key needs to be modified to reflect the new partitions. In order to accomplish this, while in Win32 mode, the modified disk layout information is stored in a temporary registry key. Then, while in Windows NT boot mode, direct reads and writes are performed on the registry files (e.g., "system" and "system.alt") that contain the "Information" registry key and the temporary registry key to replace the "Information" registry key with the temporary registry key.

29 Claims, 2 Drawing Sheets

PROVIDING DISK LAYOUT INFORMATION TO AN OPERATING SYSTEM FOR BOOTING AFTER DISK REPARTITIONING

TECHNICAL FIELD OF THE INVENTION

This invention relates in general to operating system registries, such as the registry provided in the Windows NT® operating system from Microsoft Corporation of Redmond, Wash. More specifically, this invention relates to devices and methods for manipulating an operating system registry to maintain coherency between the registry and disk partitions.

BACKGROUND OF THE INVENTION

"Partitioning" refers to a process by which a computer storage device, such as a hard disk, is divided into multiple logical devices. For example, a computer user wishing to run both the Windows NT® and Linux® operating systems from a single hard disk might partition the disk into two logical devices—one for running Windows NT®, and the other for running Linux®.

The assignee of this invention, PowerQuest Corporation, has developed partitioning software (referred to as "PartitionMagic®") to assist computer users in the partitioning process described above. Various implementations of this software are described in detail in U.S. Pat. Nos. 5,675,769 and 5,706,472 to Ruff et al., and U.S. Pat. No. 5,930,831 to Marsh et al.

When running as a Win32 program (i.e., a 32-bit Windowse program) under the Windows NT® operating system, PartitionMagic® can only operate on partitions that have no open files. Since the Windows NT® operating system always has at least some open files running from its own partition, PartitionMagic® cannot operate on the Windows NT® partition when it runs as a Win32 program.

Accordingly, PartitionMagic® has been designed to also run in the Windows NT® boot mode, where it can operate on all partitions, including the Windows NT® partition. In this mode, the Windows NT® kernel loads first. The kernel then loads any device drivers. A portion of the kernel referred to as the "Session Manager" then executes any programs that require hard disk access before the Windowse user interface is loaded. In addition to PartitionMagic®, such programs include 'autochk.exe' (a utility for checking the condition of the hard disk) and 'autoconv.exe' (a utility for performing file system conversions), both from Microsoft® Corporation, and 'autofat.exe' and 'autontfs.exe' (utilities for file defragmentation), both from Executive Software, Inc. Once these programs have executed, the Session Manager generally loads the Windows® user interface to initiate the Windows NT® Win32 mode, although PartitionMagic® reboots instead.

PartitionMagic® reboots after executing in the Windows NT® boot mode because it typically manipulates the Windows NT® partition itself If PartitionMagic® did not reboot after execution in boot mode, Windows NT® would likely crash when it attempted to load the Windows® user interface from the Windows NT® partition, because it wouldn't be able to find the interface on the newly partitioned hard drive.

Windows NT® stores disk layout information (e.g., drive letter assignments and information regarding multiple partition volumes, such as stripe sets) in the Windows NT® registry under a key named "HKEY_LOCAL_MACHINE\SYSTEM\DISK\Information". Changes can be made to this key by PartitionMagic® during the Windows NT® boot mode by making calls to the Windows NT® Registry API (Application Programming Interface). Unfortunately, these changes are discarded before taking effect when PartitionMagic® reboots instead of loading the Windows® user interface.

While PartitionMagic® typically needs to reboot after executing in the Windows NT® boot mode, it also needs to be able to manipulate the disk layout information key referred to above so that the disk layout information contained in the key is consistent with the information stored in partition tables on the hard disk being partitioned. If the information in the key and the information in the partition tables is not consistent, then Windows NT® makes default drive letter assignments that may not match the user's wishes and needs.

Accordingly, since the changes to the disk layout information key referred to above are discarded when PartitionMagic® reboots, there is a need in the art for an alternative means and method for manipulating a registry (e.g., the disk layout information key) so, for example, it conforms to the information in the partition tables on a hard disk being partitioned. Such a means and method should be effective despite a reboot.

SUMMARY OF THE INVENTION

In accordance with this invention, data stored in an operating system configuration settings repository (e.g., a Windows registry) that includes one or more repository files is modified by accessing operating system services associated with the repository in a user interface mode of the operating system to store a modified form of the data in the repository. The repository files are then directly edited in a boot mode of the operating system to replace the data with the modified form of the data.

In another embodiment of this invention, a storage device is repartitioned by making Windows NT calls in a Windows NT Win32 mode to store repartitioning information in a temporary disk layout information registry key. Then, in a Windows NT boot mode, partition tables stored on the storage device are modified to match the repartitioning information, and registry files containing the temporary disk layout information registry key and a primary disk layout information registry key are directly edited to replace the primary disk layout information registry key with the temporary disk layout information registry key.

In still another embodiment of this invention, a storage device is repartitioned by accessing operating system services in a user interface mode of an operating system to store repartitioning information in an operating system configuration settings repository that comprises one or more repository files. Then, in a boot mode of the operating system, the storage device is repartitioned using the repartitioning information, and the repository files are directly edited to replace partitioning information stored therein with the repartitioning information.

In yet another embodiment of this invention, an apparatus for modifying data stored in an operating system configuration settings repository that comprises one or more repository files includes a device that accesses operating system services associated with the repository in a user interface mode of the operating system to store a modified form of the data in the repository. Also, another device directly edits the repository files in a boot mode of the operating system to replace the data with the modified form of the data.

In an additional embodiment of this invention, the apparatus described immediately above is incorporated into an electronic system that includes an input device, an output device, a processor device, and a memory device.

In a still additional embodiment of this invention, a computer-readable medium has computer program portions embodied therein that modify data stored in an operating system configuration settings repository made up of one or more repository files. The computer program portions include a computer program portion that accesses operating system services associated with the repository in a user interface mode of the operating system to store a modified form of the data in the repository, and a computer program portion that directly edits the repository files in a boot mode of the operating system to replace the data with the modified form of the data.

DETAILED DESCRIPTION OF THE ILLUSTRATED EMBODIMENTS

Figure 1:
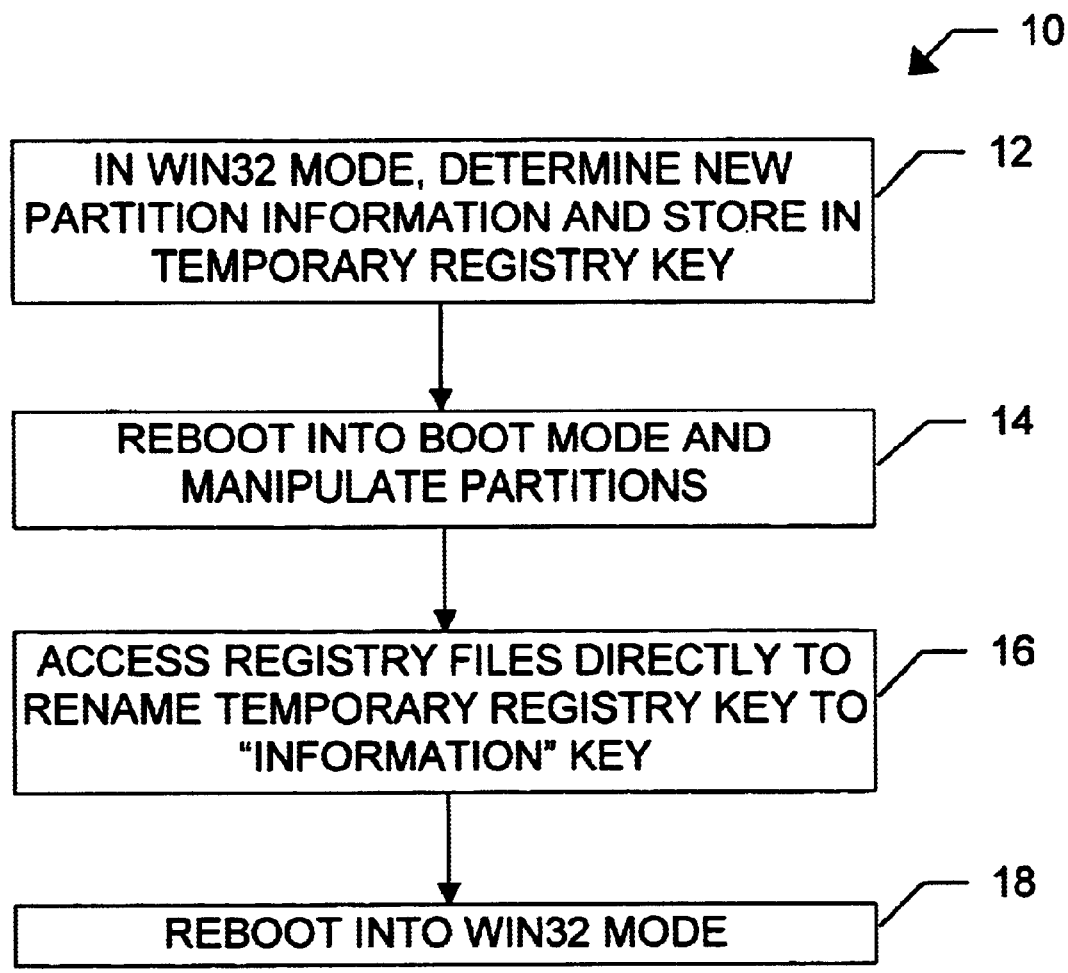
FIG. 1 is flow diagram showing a method for partitioning a hard drive in accordance with this invention.

As shown in FIG. 1, a method 10 for partitioning a hard drive (not shown) in accordance with this invention includes a step 12 in which new disk layout information (i.e., new partition information) is determined in the Win32 mode of Windows NT® (sometimes also referred to as the user-interface mode). In PartitionMagic®, for example, the disk layout information is read from the hard drive, the existing partitions are displayed to a user, and the user enters any changes he or she wishes to make to the partitions. New disk layout information that reflects these changes is then stored in step 12 in a temporary registry key named, for example, "HKEY_LOCAL_MACHINE\SYSTEM\DISK\VirtualInfo".

It will be understood by those having skill in the technical field of this invention that the invention is applicable to storage devices other than hard drives, including, for example, stripe sets and RAID (Redundant Array of Independent Disks) devices. It will also be understood that the invention is applicable to operating systems other than Windows NT®, and that the invention is not limited to use in connection with any particular registry keys including, for example, the "HKEY_LOCAL_MACHINE\SYSTEM\DISK\Information" and "HKEY_LOCAL_MACHINE SYSTEM DISK\VirtualInfo" keys. Further, it will be understood that the invention is applicable to Windows®-type registries and any other operating system configuration setting repositories.

In a step 14, a reboot into the Windows NT® boot mode (also sometimes referred to as the Windows NT® Session Manager mode) is performed in case the Windows NT® partition itself needs to be repartitioned. In this mode, the Windows NT® Session Manager maps drive letter assignments to various storage devices, including the hard drive, by accessing the old disk layout information stored in the "HKEY_LOCAL_MACHINE\SYSTEM\DISK\Information" registry key. The hard drive is then repartitioned to match the new disk layout information stored in the temporary registry key (e.g., the "HKEY_LOCAL_MACHINE\SYSTEM\DISK\VirtualInfo" key). More specifically, in the case of PartitionMagic®, for example, partition tables on the hard drive are manipulated to match the new disk layout information to repartition the hard drive.

At this stage, because the disk layout information in the partition tables on the hard drive and the actual disk letter assignments made by the Windows NT® Session Manager based upon the old disk layout information in the registry key "HKEY_LOCAL_MACHINE\SYSTEM\DISK\Information" do not coincide with one another, the new disk layout information needs to be entered into the registry key "HKEY_LOCAL_MACHINE\SYSTEM\DISK\Information", and another reboot needs to be performed so the Windows NT® Session Manager can make disk letter assignments based upon the new disk layout information. Otherwise, as discussed above, Windows NT® may not be able to find the components necessary to boot into Win32 mode, and may crash as a result. Unfortunately, as discussed above, calls made to the Windows NT® Registry API in boot mode to modify the "HKEY_LOCAL_MACHINE\SYSTEM\DISK\Information" registry key won't be implemented if a reboot is performed immediately thereafter.

Accordingly, in a step 16, the Windows NT® system files containing the "HKEY_LOCAL_MACHINE\SYSTEM" group of keys (i. e., "system" and "system.alt") are accessed through direct reads and writes by traversing each file through a parsing process until the "VirtualInfo" key is found. This key is then renamed the "Information" key so that the new disk layout information is stored in the "Information" key used by the Windows NT® Session Manager to make drive letter assignments during the boot process. The old "Information" key is also renamed in the process so that only one "Information" key exists in the system files. Those of skill in the technical field of this invention will understand that the file format and parsing process for the system files "system" and "system.alt" are readily available or ascertainable.

In a step 18, a reboot into Win32 mode is performed so that the repartitioning of the hard drive is fully implemented.

Figure 2:
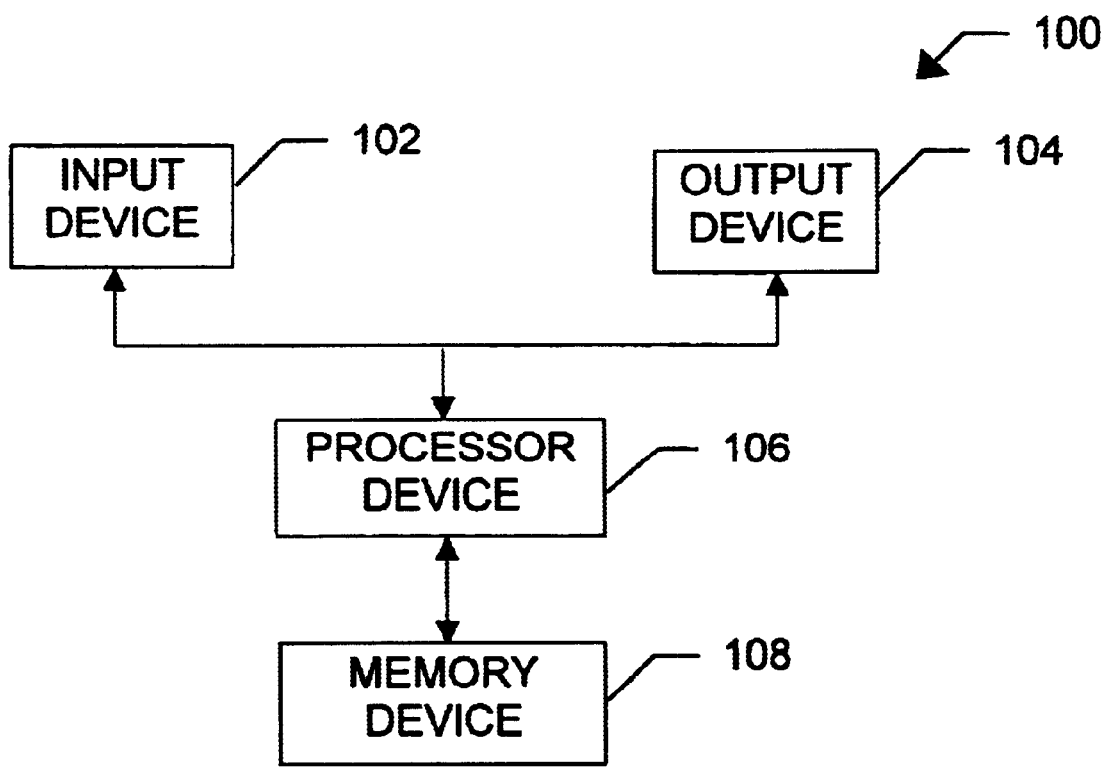
FIG. 2 is a block diagram showing an electronic system on which the method of FIG. 1 is implemented.

As shown in FIG. 2, an electronic system 100 that executes the method 10 of FIG. 1 includes an input device 102, an output device 104, a processor device 106, and a memory device 108. The electronic system 100 may be, for example, a PC-compatible computer system running the Windows NT® operating system.

It will be understood by those having skill in the technical field of this invention that the term "computer-readable medium" as used in the appended claims refers to any medium by which the functionality of a computer program portion may be realized. Such a medium may include, for example, a computer-readable storage medium such as a floppy disk, CD-ROM, DVD-ROM, Jaz® or Zip® disk, hard drive, storage area network, storage array (e.g., a RAID device), or memory device (e.g., a DRAM, SRAM, ROM, or flash EEPROM). A computer-readable medium may also include, for example, a signal carrier, such as a conductor, a carrier wave, or an electromagnetic emission (e.g., a light emission).

Also, it will be understood that the term "computer program portion" as used in the appended claims refers to any functional descriptive material for use in a computing device. Such material may include, for example, computer code capable of execution, either directly or indirectly, on a computing device. Computer code capable of indirect execution may include, for example, code requiring decryption, decompression, or run-time compilation immediately prior to execution. It will also be understood that the term "computer program portion" as used in the appended claims is not restricted to any particular source code language (e.g., Java® or C/C++) or language type (e.g., sequential or object-oriented), and that different computer program portions described as having different functions may share some code or data in common with one another.

Although this invention has been described with reference to particular embodiments, the invention is not limited to these described embodiments. For example, while the invention has been described with respect to a method having a series of sequential steps, the invention is not limited to the described sequence of steps, but rather includes within its scope any operable sequence of the described steps. Thus, the invention is limited only by the appended claims, which include within their scope all equivalent devices and methods that operate according to the principles of the invention as described.

What is claimed is:

1. A method for modifying data stored in an operating system configuration settings repository that comprises one or more repository files, the method comprising:

repartitioning a storage device such that an operating system would not find components necessary to boot because disk layout information on the storage device does not coincide with disk layout information used by the operating system;

in a user interface mode of the operating system, accessing operating system services associated with the repository to store a modified form of the data in the repository; and in a boot mode of the operating system, directly editing the one or more repository files to replace the data with the modified form of the data.

2. The method of claim 1, wherein the act of accessing operating system services associated with the repository includes making calls to one or more operating system Application Programming Interfaces (APIs).

3. The method of claim 1, wherein the operating system comprises Windows NT, wherein the operating system configuration settings repository comprises a Windows NT registry, wherein the act of, in a user interface mode of the operating system, accessing operating system services associated with, the repository to store a modified form of the data in the repository comprises, in a Win32 mode of Windows NT, accessing one or more registry Application Programming Interfaces (APIs) to store a temporary key containing the modified data in the registry.

4. The method of claim 1, wherein the operating system configuration settings repository comprises a registry, wherein the data is stored in a first registry key having a first name, wherein the modified form of the data is stored in a second registry key having a second name, wherein the act of directly editing the one or more repository files to replace the data with the modified form of the data includes performing direct reads and writes on the one or more repository files to delete the first registry key and rename the second registry key so it has the first name.

5. The method of claim 1, wherein the operating system configuration settings repository comprises a registry, wherein the data is stored in a first registry key having a first name, wherein the modified form of the data is stored in a second registry key having a second name, wherein the act of directly editing the one or more repository files to replace the data with the modified form of the data includes performing direct reads and writes on the one or more repository files to rename the first registry key and rename the second registry key so it has the first name.

6. The method of claim 1, further comprising rebooting into the user interface mode of the operating system after editing the one or more repository files.

7. A method for repartitioning a storage device, the method comprising:

in a Windows NT Win32 mode, making Windows NT calls to store repartitioning information in a temporary disk layout information registry key;

in a Windows NT boot mode:

modifying partition tables stored on the storage device to match the repartitioning information; and directly editing registry files containing the temporary disk layout information registry key and a primary disk layout information registry key to replace the primary disk layout information registry key with the temporary disk layout information registry key such that the Windows NT operating system will find components necessary to boot.

8. The method of claim 7, wherein the act of directly editing registry files containing the temporary disk layout information registry key and a primary disk layout information registry key includes directly editing registry files containing the temporary disk layout information registry key and a registry key named HKEY_LOCAL_MACHINE\SYSTEM\DISK\Information.

9. The method of claim 7, wherein the act of directly editing registry files comprises performing direct reads and writes on the registry files.

10. A method for repartitioning a storage device, the method comprising:

in a user interface mode of an operating system, accessing operating system services to store repartitioning information in an operating system configuration settings repository that comprises one or more repository files; and in a boot mode of the operating system:

repartitioning the storage device using the repartitioning information such that disk layout information on the storage device does not coincide with disk layout information used by the operating system; and directly editing the one or more repository files to replace partitioning information stored therein with the repartitioning information such that the operating system will find components necessary to boot.

11. The method of claim 10, wherein the act of accessing operating system services includes making calls to operating system Application Programming Interfaces (APIs).

12. The method of claim 10, wherein the act of repartitioning the storage device comprises modifying partition tables stored on the storage device.

13. An apparatus for modifying data stored in an operating system configuration settings repository that comprises one or more repository files, the apparatus comprising:

a device for repartitioning a storage device such that an operating system would not find components necessary to boot because disk layout information on the storage device does not coincide with disk layout information used by the operating system;

a device for accessing operating system services associated with the repository in a user interface mode of the operating system to store a modified form of the data in the repository; and a device for directly editing the one or more repository files in a boot mode of the operating system to replace the data with the modified form of the data.

14. The apparatus of claim 13, wherein the accessing and editing devices together comprise an executable computer program.

15. An apparatus for repartitioning a storage device, the apparatus comprising:

a device for accessing, in a user interface mode of an operating system, operating system services to store repartitioning information in an operating system configuration settings repository that comprises one or more repository files;

a device for repartitioning the storage device in a boot mode of the operating system using the repartitioning information such that disk layout information on the storage device does not coincide with disk layout information used by the operating system; and a device for directly editing the one or more repository files in the boot mode of the operating system to replace partitioning information stored therein with the repartitioning information such that the operating system will find components necessary to boot.

16. The apparatus of claim 15, wherein the accessing device comprises a device for calling operating system Application Programming Interfaces (APIs).

17. The apparatus of claim 15, wherein the repartitioning device comprises a device for modifying partition tables stored on the storage device.

18. The apparatus of claim 15, wherein the editing device comprises a device for performing direct reads and writes on the repository files.

19. An electronic system comprising an input device, an output device, a memory device, a storage device, and a processor device coupled to at least the input, output, and memory devices, at least one of the input, output, memory, storage, and processor devices including an apparatus for modifying data stored in an operating system configuration settings repository that comprises one or more repository files, the apparatus comprising:

a device for repartitioning the storage device such that an operating system would not find components necessary to boot because disk layout information on the storage device does not coincide with disk layout information used by the operating system;

a device for accessing operating system services associated with the repository in a user interface mode of the operating system to store a modified form of the data in the repository; and a device for directly editing the one or more repository files in a boot mode of the operating system to replace the data with the modified form of the data.

20. The electronic system of claim 19, wherein the electronic system comprises a computer system.

21. A computer-readable medium having one or more computer program portions embodied therein for modifying data stored in an operating system configuration settings repository that comprises one or more repository files, the computer program portions comprising:

a computer program portion for repartitioning a storage device such that an operating system would not find components necessary to boot because disk layout information on the storage device does not coincide with disk layout information used by the operating system, a computer program portion for accessing operating system services associated with the repository in a user interface mode of the operating system to store a modified form of the data in the repository; and a computer program portion for directly editing the one or more repository files in a boot mode of the operating system to replace the data with the modified form of the data.

22. The computer-readable medium of claim 21, wherein the computer-readable medium comprises a computer-readable storage medium selected from a group comprising a floppy disk, a CD-ROM, a DVD-ROM, a Jaz disk, a Zip disk, a hard drive, a storage area network, and a storage array.

23. The computer-readable medium of claim 21, wherein the computer-readable medium comprises a signal carrier selected from a group comprising a carrier wave, a conductor, and an electromagnetic emission.

24. The computer-readable medium of claim 21, wherein the computer-readable medium having one or more computer program portions embodied therein comprises a computer-readable storage medium having one or more computer program portions stored thereon.

25. The computer-readable medium of claim 21, wherein the computer-readable medium having one or more computer program portions embodied therein comprises a signal carrier having one or more computer program portions propagating thereon.

26. The method of claim 1, wherein the one or more repository files each comprise an organized collection of bytes.

27. The method of claim 26, wherein the one or more repository files each comprise a Windows NT file.

28. The method of claim 7, wherein the registry files each comprise an organized collection of bytes.

29. The method of claim 28, wherein the registry files each comprise a Windows NT file.

* * * * *